United States Patent
Qu et al.

(10) Patent No.: US 12,545,604 B2
(45) Date of Patent: Feb. 10, 2026

(54) SYSTEM AND METHOD FOR SOLAR-DRIVEN PHOTOTHERMAL SEAWATER DESALINATION AND ION ELECTROOSMOSIS POWER GENERATION

(71) Applicant: Xi'an Jiaotong University, Shaanxi (CN)

(72) Inventors: Zhiguo Qu, Shaanxi (CN); Qian Liu, Shaanxi (CN); Jianfei Zhang, Shaanxi (CN); Qinlong Ren, Shaanxi (CN)

(73) Assignee: XI'AN JIAOTONG UNIVERSITY, Shaanxi (CN)

( * ) Notice: Subject to any disclaimer, the term of this patent is extended or adjusted under 35 U.S.C. 154(b) by 1172 days.

(21) Appl. No.: 17/486,247

(22) Filed: Sep. 27, 2021

(65) Prior Publication Data
US 2022/0119285 A1 Apr. 21, 2022

(30) Foreign Application Priority Data
Oct. 20, 2020 (CN) .......................... 202011128846.5

(51) Int. Cl.
*C02F 1/469* (2023.01)
*B01D 61/42* (2006.01)
*C02F 1/44* (2023.01)
*C02F 103/08* (2006.01)

(52) U.S. Cl.
CPC .......... *C02F 1/4698* (2013.01); *B01D 61/427* (2013.01); *C02F 1/447* (2013.01); *C02F 2103/08* (2013.01); *C02F 2201/009* (2013.01)

(58) Field of Classification Search
CPC .... C02F 1/4698; C02F 1/447; C02F 2103/08; C02F 2201/009; C02F 1/14; B01D 61/427; B01D 2313/365; B01D 2313/367; B01D 61/52; Y02A 20/142; Y02A 20/124; Y02A 20/212
See application file for complete search history.

(56) References Cited

U.S. PATENT DOCUMENTS

| | | | |
|---|---|---|---|
| 11,318,424 B2 * | 5/2022 | Ardo | B01D 71/36 |
| 11,502,323 B1 * | 11/2022 | Nana | C25B 9/21 |
| 2020/0140296 A1 * | 5/2020 | Choi | B01D 61/463 |
| 2021/0179453 A1 * | 6/2021 | Qu | C02F 1/4693 |

FOREIGN PATENT DOCUMENTS

CN 111628675 A * 9/2020 ............... H02N 3/00

OTHER PUBLICATIONS

Machine Translation of CN 111628675 A.*

* cited by examiner

*Primary Examiner* — Bryan D. Ripa
(74) *Attorney, Agent, or Firm* — STAAS & HALSEY LLP

(57) ABSTRACT

The present disclosure discloses a system and a method for solar-driven photothermal seawater desalination and ion electroosmosis power generation. In the system, a first reservoir is provided with a first electrode immersed in seawater; a second reservoir is connected to the first reservoir via a cation selective nanofilm; a third reservoir is provided with a second electrode immersed in seawater, and the third reservoir is connected to the second reservoir via an anion selective nanofilm; and an adjustable sun-visor shields the cation selective nanofilm to form a first preset part of solar illumination and shields the anion selective nanofilm to form a second preset part of the solar illumination. Therefore, the cation selective nanofilm and the anion selective nanofilm are each under an asymmetric illumination to generate a temperature gradient.

18 Claims, 2 Drawing Sheets

SYSTEM AND METHOD FOR SOLAR-DRIVEN PHOTOTHERMAL SEAWATER DESALINATION AND ION ELECTROOSMOSIS POWER GENERATION

CROSS REFERENCE TO RELATED APPLICATION(S)

This patent application claims the benefit and priority of Chinese Patent Application No. 202011128846.5, filed on Oct. 20, 2020, the disclosure of which is incorporated by reference herein in its entirety as part of the present application.

TECHNICAL FIELD

The present disclosure relates to the technical field of desalination and energy conversion and utilization, in particular to a system and a method for solar-driven photothermal seawater desalination and ion electroosmosis power generation.

BACKGROUND ART

As a clean and efficient renewable energy, solar energy has extremely important values in many fields. However, how to make full use of the solar energy and improve its use efficiency is still the top priority to solve the energy shortage problem. There are mainly three ways to use the solar energy: photothermal conversion, photoelectric conversion and photochemical conversion. One of the most important ways to use the photothermal conversion of the solar energy is obtaining fresh water by photothermal evaporation of solar energy and condensation, which is also an important way to solve the problem of insufficient fresh water. Based on this, various two-dimensional and three-dimensional photothermal materials and photothermal structures have been researched endlessly. These researches also significantly promote efficiency improvement of the desalination by the photothermal evaporation of solar energy. However, there are inevitably some problems during the photothermal evaporation of solar energy. For example, an excessive salt concentration due to the water evaporation may cause crystallization to block the water delivery channels to affect further evaporation, and the parallelization of condensation modules during water collection can undoubtedly increase the cost of desalination. These are all important factors restricting the use of solar energy and desalination. Therefore, it is an urgent problem to be solved of the comprehensive utilization of various forms of energy conversion and the exploration of novel, economical and efficient solar energy-based desalination methods.

The above information disclosed in the background art is only used to enhance the understanding of the background of the present disclosure, and therefore may contain information that does not form the prior art known to those of ordinary skill in the art.

SUMMARY

An objective of the present disclosure is to provide a system and a method for solar-driven photothermal seawater desalination and ion electroosmosis power generation, to overcome the disadvantages in the prior art. The present disclosure comprehensively uses photothermal conversion of solar energy and reverse electrodialysis to generate a temperature gradient through a two-dimensional photothermal nanofilm, thereby achieving the ion electroosmosis power generation and the desalination. The objective of the present disclosure is achieved by the following technical solutions:

A system for solar-driven photothermal seawater desalination and ion electroosmosis power generation includes:
  a first reservoir internally provided with a first electrode immersed in seawater;
  a second reservoir connected to the first reservoir via a cation selective nanofilm, where the cation selective nanofilm is provided with a light-transmitting sealing layer;
  a third reservoir internally provided with a second electrode immersed in seawater, where the third reservoir is connected to the second reservoir via an anion selective nanofilm, the anion selective nanofilm is provided with the light-transmitting sealing layer, and the first electrode and the second electrode are connected through a signal collector that collects current signals; and
  an adjustable sun-visor for shielding the cation selective nanofilm to form a first preset part of solar illumination and shielding the anion selective nanofilm to form a second preset part of the solar illumination, where the cation selective nanofilm and the anion selective nanofilm are each under an asymmetric illumination to generate a temperature gradient.

In the system, the system may include an odd number of reservoirs, and the cation selective nanofilm and the anion selective nanofilm may be alternately arranged between the adjacent reservoirs.

In the system, the cation selective nanofilm and/or the anion selective nanofilm may generate the temperature gradient to cause a Gibbs free energy difference that drives a directional ion transportation to generate an ion current.

In the system, the cation selective nanofilm may include a nano cation channel communicating with the first reservoir and the second reservoir, and the anion selective nanofilm may include a nano anion channel communicating with the second reservoir and the third reservoir.

In the system, the cation selective nanofilm and/or the anion selective nanofilm may include a two-dimensional multilayer nanofilm with a photothermal effect.

In the system, the two-dimensional multilayer nanofilm may have a thickness of 5-15 µm, a thickness of each layer of film not exceeding 10 nm and an interlayer spacing of 1-2 nm.

In the system, the light-transmitting sealing layer may be made of highly light-transmitting polydimethylsiloxane and may have a thickness of 10-100 µm.

In the system, the adjustable sun-visor may be made of a heat-insulating material of any one selected from the group consisting of a polystyrene foam, a polyurethane foam and a glass fiber.

In the system, the first preset part may be 0-50% the area of the cation selective nanofilm, and the second preset part may be 0-50% the area of the anion selective nanofilm.

A method of the system for solar-driven photothermal seawater desalination and ion electroosmosis power generation includes the following steps:
  step 1, the adjustable sun-visor shielding the cation selective nanofilm to form the first preset part of the solar illumination and shielding the anion selective nanofilm to form the second preset part of the solar illumination, such that the cation selective nanofilm and the anion selective nanofilm are each under an asymmetric illumination;

step 2, the temperature gradient generated by the photothermal effect causing the Gibbs free energy difference to drive substance diffusion;

step 3, cations and anions in the second reservoir, driven by the Gibbs free energy difference, directionally migrating to the first reservoir and the third reservoir on both sides through the cation selective nanofilm and the anion selective nanofilm, respectively, and generating an ion diffusion current; and step 4, collecting the current signals until the current changes direction, and collecting liquid in the second reservoir in the middle to obtain desalinated solution.

Compared with the prior art, the present disclosure has the following beneficial effects:

1. The ion diffusion power generation can be realized without salt difference or even under reverse concentration gradient.
2. Negative and positive salt ions in seawater can be simultaneously removed to obtain purified water after desalination.
3. The system is stable and simple to operate, and condensing devices in traditional desalination technology are reduced, thereby saving cost and space.
4. The photothermal conversion of solar energy and the reverse electrodialysis technology are combined to provide new ideas and solutions for the improvement and engineering use of the traditional solar energy-based desalination technology.

The above description is merely an overview of the technical solution of the present disclosure. To make the technical means of the present disclosure clearer and more understandable, such that those skilled in the art can implement according to the contents of the specification, and to make the above and other objectives, features and advantages of the present disclosure more obvious and easier to understand. The present disclosure is described in detail below with reference to the specific implementations.

BRIEF DESCRIPTION OF THE DRAWINGS

By reading the detailed description in the preferred examples below, various other advantages and benefits of the present disclosure will become clear to those of ordinary skill in the art. The accompanying drawings of the specification are provided merely for illustrating the specific examples, rather than to limit the present disclosure. Apparently, the accompanying drawings in the following description show merely some examples of the present disclosure, and other drawings may be derived from these accompanying drawings by a person of ordinary skill in the art without creative efforts. Throughout the accompanying drawings, the same components are denoted by the same drawing reference signs.

In the accompanying drawings.

Figure 1:
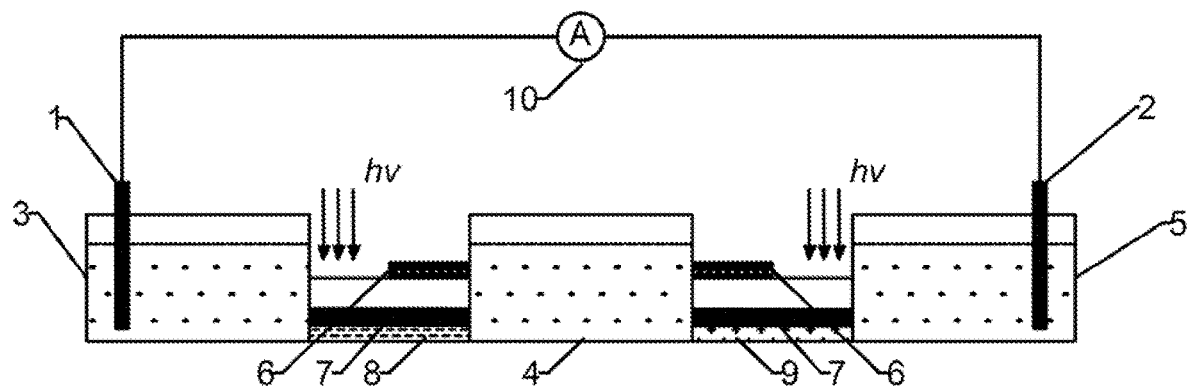
FIG. 1 is a schematic view of a system for solar-driven photothermal seawater desalination and ion electroosmosis power generation provided by an example of the present disclosure.

The drawing reference signs are as follows: 1, a first electrode; 2, a second electrode; 3, a first reservoir; 4, a second reservoir; 5, a third reservoir; 6, an adjustable sun-visor; 7, a light-transmitting sealing layer; 8, a cation selective nanofilm; 9, an anion selective nanofilm; and 10, a signal collector.

The present disclosure is further described below with reference to the accompanying drawings and examples.

DETAILED DESCRIPTION OF THE EMBODIMENTS

The specific examples of the present disclosure will be described in more detail below with reference to the accompanying drawings 1-3. Although the accompanying drawings show exemplary examples of the present disclosure, it should be understood that the present disclosure may be implemented in various forms and should not be limited to the examples set forth herein. The examples are provided so that the present disclosure will be more fully understandable, and will fully convey the scope of the present disclosure to those skilled in the art.

Some words are used to name specific components in the specification and claims. Those skilled in the art should understand that hardware manufacturers may name the same components with different words. The components in the specification and claims are distinguished by different functions instead of different names. The word "comprise" or "include" as used throughout the specification and claims is an open term and should be interpreted as "including but not limited to". The subsequent description of the specification is preferred examples of the present disclosure. However, the description takes the general principles of the specification as the objective, and is not intended to limit the scope of the present disclosure. The protection scope of the present disclosure is defined by the appended claims.

For ease of understanding of the examples of the present disclosure, several specific examples will be taken for further explanation and description in conjunction with the accompanying drawings, and each accompanying drawing does not constitute a limitation to the examples of the present disclosure.

As shown in FIG. 1. A system for solar-driven photothermal seawater desalination and ion electroosmosis power generation included:

a first reservoir 3 internally provided with a first electrode 1 immersed in seawater;

a second reservoir 4 connected to the first reservoir 3 via a cation selective nanofilm 8, where the cation selective nanofilm 8 was provided with a light-transmitting sealing layer 7;

a third reservoir 5 internally provided with a second electrode 2 immersed in seawater, where the third reservoir 5 was connected to the second reservoir 4 via an anion selective nanofilm 9, the anion selective nanofilm 9 was provided with the light-transmitting sealing layer 7, and the first electrode 1 and the second electrode 2 were connected through a signal collector 10 that collected current signals; and an adjustable sun-visor 6 for shielding the cation selective nanofilm 8 to form a first preset part of solar illumination and shielding the anion selective nanofilm 9 to form a second preset part of the solar illumination, where the cation selective nanofilm 8 and the anion selective nanofilm 9 could be each under an asymmetric illumination to generate a temperature gradient.

In the system, the adjustable sun-visor could change temperature gradient distribution and temperature difference by changing a distance between an illumination center and a film center (asymmetric illumination position), or size of light spots, and by changing illumination direction such as a left illumination or a right illumination of the film, thereby changing intensity and direction of the current. There was no current generated when the light illuminated on the film center (a symmetrical illumination). For example, the adjustable sun-visor could controllably adjust the temperature gradient.

In a preferred example of the system, the system included an odd number of the reservoirs, and the cation selective nanofilm 8 and the anion selective nanofilm 9 were alternately arranged between the adjacent reservoirs.

In a preferred example of the system, the cation selective nanofilm 8 and/or the anion selective nanofilm 9 generated the temperature gradient to cause a Gibbs free energy difference that drove a directional ion transportation to generate an ion current.

In a preferred example of the system, the cation selective nanofilm 8 included a nano cation channel communicating with the first reservoir 3 and the second reservoir 4, and the anion selective nanofilm 9 included a nano anion channel communicating with the second reservoir 4 and the third reservoir 5.

In a preferred example of the system, the cation selective nanofilm 8 and/or the anion selective nanofilm 9 included a two-dimensional multilayer nanofilm with a photothermal effect.

In a preferred example of the system, the two-dimensional multilayer nanofilm had a thickness of 5-15 μm and a thickness of each layer of film not exceeding 10 nm to reduce resistance of the nanofilm and improve ion conductivity, and had an interlayer spacing of 1-2 nm to improve ion selectivity of nano channels.

In a preferred example of the system, the light-transmitting sealing layer 7 was made of highly light-transmitting polydimethylsiloxane and had a thickness of 10-100 μm to ensure optical performance and reduce optical loss.

In a preferred example of the system, the adjustable sun-visor 6 was made of a heat-insulating material of any one selected from the group consisting of a polystyrene foam, a polyurethane foam and a glass fiber.

In a preferred example of the system, the first preset part was 0-50% the area of the cation selective nanofilm 8, and the second preset part was 0-50% the area of the anion selective nanofilm 9.

In an example, a first preset part had an area equal to that of a second preset part.

In an example, the signal collector 10 was a data collector.

To further understand the present disclosure, in an example, the system included a three-chamber electrolytic cell, a first electrodes 1 and a second electrodes 2 located in a first reservoir 3 and a third reservoir 5 on both sides of the three-chamber electrolytic cell, respectively, a light-transmitting sealing layer 7, an adjustable sun-visor 6, a cation selective nanofilm 8 and an anion selective nano film 9; the cation selective nanofilm 8 and the anion selective nanofilm 9 were alternately arranged between the adjacent reservoirs of the electrolytic cell; and the cation selective nanofilm 8 and the anion selective nanofilm 9 were sealed by the light-transmitting sealing layer 7.

The adjustable sun-visor 6 was used to shield a part of the cation selective nanofilm 8 and a part of the anion selective nanofilm 9, such that sunlight irradiated the other part of the cation selective nanofilm 8 and the anion selective nanofilm 9. Accordingly, the nanofilm could be under an asymmetric illumination.

In the example, the Gibbs free energy difference was generated through the photothermal conversion of solar energy to drive the directional ion transportation, such that the ion diffusion power generation could be realized without salt difference or even under reverse concentration gradient. Negative and positive salt ions in seawater could be simultaneously removed to obtain purified water after desalination through the joint action of the cation selective nanofilm and the anion selective nanofilm. The system was stable and simple to operate, and condensing devices in a traditional desalination technology were reduced, thereby saving cost and space. The photothermal conversion of solar energy and the reverse electrodialysis technology were combined to provide new ideas and solutions for the improvement and engineering use of the traditional solar energy-based desalination technology.

In another example, the cation selective nanofilm and the anion selective nanofilm caused a temperature gradient by an asymmetric illumination, and the temperature gradient created a Gibbs free energy difference to drive a directional ion transportation to generate an ion current.

In the example, as shown in FIG. 1. A three-chamber electrolytic cell included equal volumes of seawater in three reservoirs. An adjustable sun-visor 6 was adjusted to shield a right part of a cation selective nanofilm 8 and a left part of an anion selective nanofilm 9 at the same time, and to illuminate other parts of the cation selective nanofilm 8 and the anion selective nanofilm 9, such that the nanofilms were exposed to the asymmetric illumination. The cation selective nanofilm 8 and the anion selective nanofilm 9 absorbed light energy and converted into heat energy, thereby generating a temperature gradient on the surface of the nanofilm. Gibbs free energy in an illuminated area decreased along with increasing temperature, while the Gibbs free energy in a non-illuminated area remained unchanged. Driven by a Gibbs free energy difference, directional ion transportation was conducted in the same direction as the temperature gradient. Cations in the second reservoir 4 moved directionally to the first reservoir 3 through the cation selective nanofilm 8 to generate an ion current $I_c$; and anions in the second reservoir 4 moved directionally to the third reservoir 5 through the anion selective nanofilm 9 to generate an ion current $I_a$. Due to the same current direction of the two ions, the system generated a transmembrane ion current $I_1=I_c+I_a$. As the salt ions in the second reservoir 4 migrated to the first reservoir 3 and the third reservoir 5, the concentration of the salt solution in the second reservoir 4 decreased. The first reservoir 3 had a salt difference between the third reservoir 5 and the second reservoir 4 to drive reverse migration of the ions and generate a reverse ion diffusion current $I_2$ caused by the salt difference. When a driving force generated by the temperature difference was greater than that generated by the salt difference, a net current of the system was $I_0=I_1-I_2$. The salt ions in the second reservoir 4 continued to migrate to the reservoirs on both sides. The current was reversed until the driving force generated by the temperature difference was less than that generated by the salt difference. At this time, liquid collected in the second reservoir 4 was the desalinated solution.

In another example, the cation selective nanofilm and/or the anion selective nanofilm were two-dimensional multilayer nanofilms with a desirable photothermal effect, for example, an MXene film.

In another example, the two-dimensional multilayer nanofilm had a thickness of 5-15 μm, a thickness of each layer of film not exceeding 10 nm and an interlayer spacing of 1-2 nm.

In the example, to ensure the photothermal performance of the nanofilm and improve the transport performance of cations or anions, the nanofilm was a two-dimensional multilayer MXene nanofilm with a desirable photothermal performance, and the nanofilm had a total thickness of 5-15 μm, a thickness of each layer of film not exceeding 10 nm and an interlayer spacing of 1-2 nm.

In another example, the cation selective nanofilm and the anion selective nanofilm included nano ion channels communicating with the adjacent reservoirs.

Figure 2:
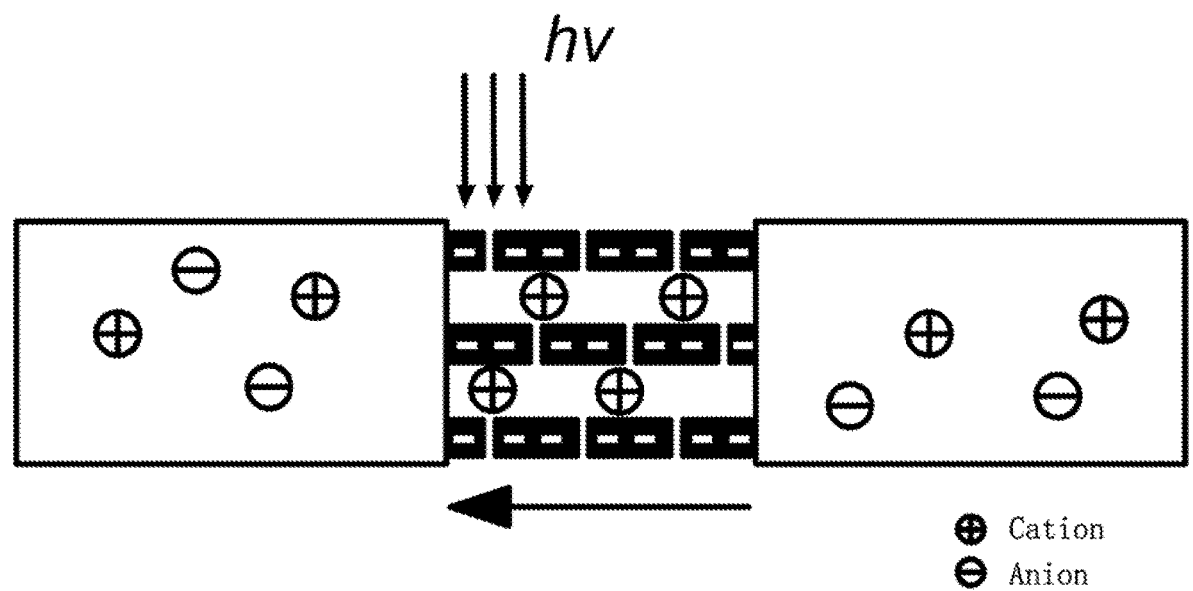
FIG. 2 is a schematic diagram of ion flow in a cation selective nanofilm under an asymmetric illumination in a system for solar-driven photothermal seawater desalination and ion electroosmosis power generation provided by another example of the present disclosure.

In the example, as shown in FIG. 2, the ion channels in the cation selective nanofilm formed a negatively-charged surface. When the ion channel was reduced to 1-2 nm, electric double layers of upper and lower surfaces overlapped and only cations could pass through the channel according to electrostatic theory. Therefore, under the asymmetric illumination on the left side, the surface of the nanofilm absorbed light energy and converted into heat energy, generating a temperature gradient on the surface of the film. The Gibbs free energy difference generated between the illuminated area and the non-illuminated area drove directional migration of the cations from a low temperature side to a high temperature side. The cations in the right reservoir migrated to the left reservoir through the cation selective nanofilm. The concentration of positive salt ions in the right reservoir decreased and an ion current was generated to convert light energy into electrical energy.

Figure 3:
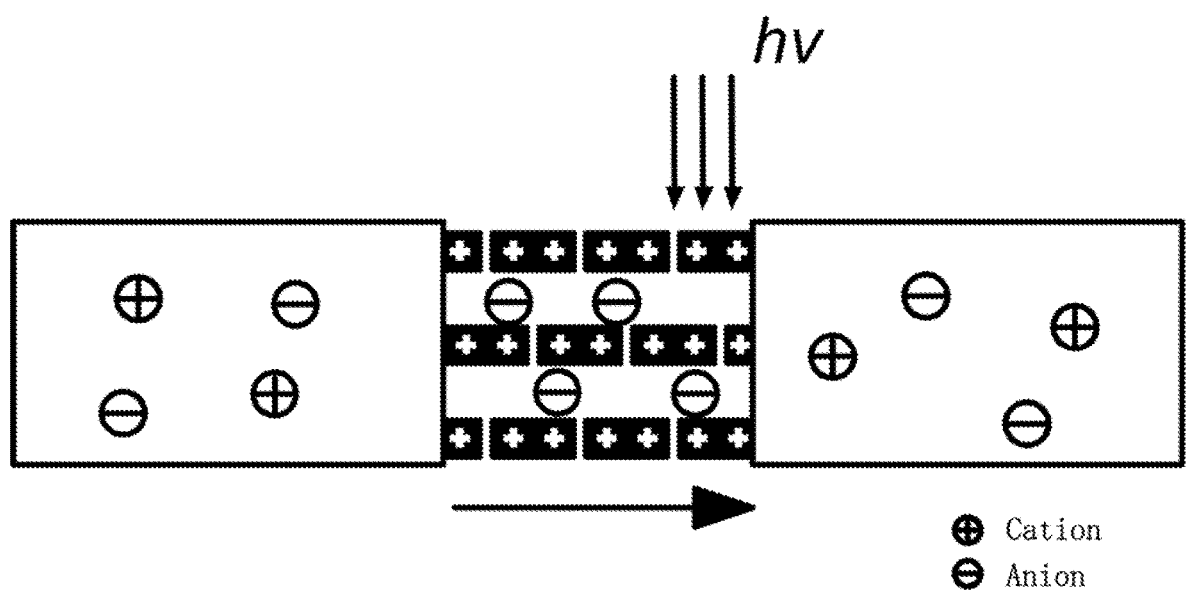
FIG. 3 is a schematic diagram of ion flow in an anion selective nanofilm under an asymmetric illumination in a system for solar-driven photothermal seawater desalination and ion electroosmosis power generation provided by an example of the present disclosure.

In addition, as shown in FIG. 3, the ion channels in the anion selective nanofilm formed a positively-charged surface. When the ion channel was reduced to 1-2 nm, electric double layers of upper and lower surfaces overlapped and only anions could pass through the channel according to electrostatic theory. Therefore, under the asymmetric illumination on the right side, the surface of the nanofilm absorbed light energy and converted into heat energy, generating a temperature gradient on the surface of the film. The Gibbs free energy difference generated between the illuminated area and the non-illuminated area drove directional migration of the anions from a low temperature side to a high temperature side. The anions in the left reservoir migrated to the right reservoir through the anion selective nanofilm. The concentration of negative salt ions in the left reservoir decreased and an ion current was generated to convert light energy into electrical energy.

In another example, the ion channel had a length that may not exceed 3 cm.

In the example, to reduce the film resistance and maintain the transport performance of cations or anions, the ion channel had a length of not exceeding 3 cm.

In another example, the light-transmitting sealing layer was prepared with highly light-transmitting polydimethylsiloxane and had a thickness of 10-100 μm.

In the example, to prevent liquid leakage on the surface of the nanofilm and at the connection between the nanofilms and the reservoirs of the electrolytic cell, polydimethylsiloxane was used to seal the nanofilm. The sealing layer had a thickness of 10-100 μm to improve the utilization rate of solar energy and ensure light transmittance performance.

In another example, the sun-visor was made of a heat-insulating material of any one selected from the group consisting of a polystyrene foam, a polyurethane foam and a glass fiber. The sun-visor was used to adjust the light-receiving area of the nanofilm with a range of ½ times the length of the nanofilm to 1 times the length of the nanofilm.

In another example, the system further included a signal acquisition device, where the signal acquisition device included a first electrode 1, a second electrode 2 and a signal collector 10; the first electrode 1 and the second electrode 2 were connected to the signal collector 10 for collecting current signals of the system, and collecting desalinated liquid according to the current signals.

In the example, the first electrode and the second electrode were arranged in a first reservoir and a third reservoir on both sides of a three-chamber electrolytic cell, respectively. When ions in the nanofilm directionally migrated driven by the temperature gradient, the signal collector collected the current signals of the system and controlled the collection of the desalinated liquid through the first electrode and the second electrode. The strength of the collected current signals could also be adjusted by adjusting the length of the sun-visor to change the light-receiving area of the nanofilm. An electrochemical oxidation-reduction occurred on the surfaces of the first electrode and the second electrode to maintain the electrical neutrality of the salt solution, and generated electrons might be transferred through an external load circuit.

A method of the system for solar-driven photothermal seawater desalination and ion electroosmosis power generation included the following steps:

step 1, the adjustable sun-visor 6 shielded the cation selective nanofilm 8 to form the first preset part of the solar illumination and shielded the anion selective nanofilm 9 to form the second preset part of the solar illumination, such that the cation selective nanofilm 8 and the anion selective nanofilm 9 could be each under an asymmetric illumination;

step 2, the temperature gradient generated by photothermal effect caused the Gibbs free energy difference to drive substance diffusion;

step 3, cations and anions in the second reservoir 4, driven by the Gibbs free energy difference, directionally migrated to the first reservoir 3 and the third reservoir 5 on both sides through the cation selective nanofilm 8 and the anion selective nanofilm 9, respectively, and generated an ion diffusion current; and step 4, the current signals were collected until the current changed direction, and liquid in the second reservoir in the middle was collected to obtain desalinated solution.

In a preferred example, the method included the following steps:

S100: the adjustable sun-visor simultaneously shielded the right side of the cation selective nanofilm and the left side of the anion selective nanofilm, and illuminated the left side of the cation selective nanofilm and the right side of the anion selective nanofilm;

S200, light-receiving parts of the cation selective nanofilm and the anion selective nanofilm generated a temperature gradient due to the photothermal effect, causing the Gibbs free energy difference to drive the substance diffusion;

S300, cations and anions in the second reservoir in the middle, driven by the Gibbs free energy difference, directionally migrated to the first reservoir and the third reservoir on both sides through the cation selective nanofilm and the anion selective nanofilm, respectively, and generated an ion diffusion current; and S400, the current signals of the system were collected until the current changed direction, and liquid in the second reservoir in the middle was collected to obtain desalinated solution.

INDUSTRIAL APPLICABILITY

The system and the method for solar-driven photothermal seawater desalination and ion electroosmosis power generation of the present disclosure can be used in the field of desalination.

The basic principles of the present disclosure are described above in conjunction with specific examples. However, it should be pointed out that the advantages, properties, and effects and the like mentioned in the present disclosure are only examples and not limitations. It cannot be considered that these advantages, properties, and effects and the like are necessary for each example of the present disclosure. In addition, the specific details disclosed above are only for illustration and explanation, rather than limitation, and the above details do not limit the present disclosure to be achieved by the above specific details.

The above examples have been given for illustration and description. In addition, this description is not intended to limit the examples of the present disclosure to the form disclosed herein. Although a number of examples have been discussed above, those skilled in the art will recognize certain variations, modifications, changes, additions, and sub-combinations thereof.

What is claimed is:

1. A system for solar-driven photothermal seawater desalination and ion electroosmosis power generation, comprising:
    a plurality of reservoirs including at least,
        a first reservoir internally provided with a first electrode immersed in seawater,
        a second reservoir connected to the first reservoir via a cation selective nanofilm, wherein the cation selective nanofilm is provided with a first light-transmitting sealing layer, and
        a third reservoir internally provided with a second electrode immersed in seawater, wherein the third reservoir is connected to the second reservoir via an anion selective nanofilm, the anion selective nanofilm is provided with a second light-transmitting sealing layer, and the first electrode and the second electrode are connected through a signal collector that collects current signals; and
    an adjustable sun-visor for shielding the cation selective nanofilm to form a first preset part of solar illumination and shielding the anion selective nanofilm to form a second preset part of the solar illumination, wherein the cation selective nanofilm and the anion selective nanofilm are each under an asymmetric illumination to generate a temperature gradient.

2. The system for solar-driven photothermal seawater desalination and ion electroosmosis power generation according to claim 1, wherein the plurality of reservoirs is an odd number of the reservoirs, and the cation selective nanofilm and the anion selective nanofilm are alternately arranged between the adjacent reservoirs among the odd number of reservoirs.

3. The system for solar-driven photothermal seawater desalination and ion electroosmosis power generation according to claim 1, wherein the cation selective nanofilm and/or the anion selective nanofilm generate the temperature gradient to cause a Gibbs free energy difference that drives a directional ion transportation to generate an ion diffusion current signal among the current signals.

4. The system for solar-driven photothermal seawater desalination and ion electroosmosis power generation according to claim 1, wherein the cation selective nanofilm comprises a nano cation channel communicating with the first reservoir and the second reservoir, and the anion selective nanofilm comprises a nano anion channel communicating with the second reservoir and the third reservoir.

5. The system for solar-driven photothermal seawater desalination and ion electroosmosis power generation according to claim 1, wherein the cation selective nanofilm and/or the anion selective nanofilm comprise a two-dimensional multilayer nanofilm with a photothermal effect.

6. The system for solar-driven photothermal seawater desalination and ion electroosmosis power generation according to claim 5, wherein the two-dimensional multilayer nanofilm has a thickness of 5-15 μm, and a thickness of each layer of the two-dimensional multilayer nanofilm does film not exceed 10 nm to reduce resistance of the two-dimensional multilayer nanofilm and improve ion conductivity; and
    the two-dimensional multilayer nanofilm has an interlayer spacing of 1-2 nm.

7. The system for solar-driven photothermal seawater desalination and ion electroosmosis power generation according to claim 1, wherein each of the first light-transmitting sealing layer and the second light-transmitting sealing layer is made of highly light-transmitting polydimethylsiloxane and has a thickness of 10-100 μm to ensure optical performance and reduce optical loss.

8. The system for solar-driven photothermal seawater desalination and ion electroosmosis power generation according to claim 1, wherein the adjustable sun-visor is made of a heat-insulating material of any one selected from the group consisting of a polystyrene foam, a polyurethane foam and a glass fiber.

9. The system for solar-driven photothermal seawater desalination and ion electroosmosis power generation according to claim 1, wherein the first preset part is 0-50% an area of the cation selective nanofilm, and the second preset part is 0-50% an area of the anion selective nanofilm.

10. A method of solar-driven photothermal seawater desalination and ion electroosmosis power generation using the system according to claim 1, the method comprising:
    by the adjustable sun-visor,
        shielding the cation selective nanofilm to form the first preset part of the solar illumination and shielding the anion selective nanofilm to form the second preset part of the solar illumination, such that the cation selective nanofilm and the anion selective nanofilm are each under an asymmetric illumination to generate the temperature gradient,
    the temperature gradient generated by a photothermal effect causing a Gibbs free energy difference to drive substance diffusion; diffusion, such that cations and anions in the second reservoir, driven by the Gibbs free energy difference, directionally migrate to the first reservoir and the third reservoir on both sides through the cation selective nanofilm and the anion selective nanofilm, respectively, and an ion diffusion current signal among the current signals is generatable; and
    collecting the current signals until the ion diffusion current signal indicates a change in direction, and collecting liquid in the second reservoir to obtain desalinated solution.

11. The method according to claim 10, wherein the plurality of reservoirs is an odd number of reservoirs, and the cation selective nanofilm and the anion selective nanofilm are alternately arranged between adjacent reservoirs among the odd number of reservoirs.

12. The method according to claim 10, wherein the cation selective nanofilm and/or the anion selective nanofilm generate the temperature gradient to cause a Gibbs free energy difference that drives a directional ion transportation to generate an ion current.

13. The method according to claim 10, wherein the cation selective nanofilm comprises a nano cation channel communicating with the first reservoir and the second reservoir, and the anion selective nanofilm comprises a nano anion channel communicating with the second reservoir and the third reservoir.

14. The method according to claim 10, wherein the cation selective nanofilm and/or the anion selective nanofilm comprise a two-dimensional multilayer nanofilm with a photothermal effect.

15. The method according to claim 14, wherein the two-dimensional multilayer nanofilm has a thickness of 5-15 µm, and a thickness of each layer of the two-dimensional multilayer nanofilm does not exceed 10 nm to reduce resistance of the two-dimensional multilayer nanofilm and improve ion conductivity; and the two-dimensional multilayer nanofilm has an interlayer spacing of 1-2 nm.

16. The method according to claim 10, wherein each of the first light-transmitting sealing layer and the second light-transmitting sealing layer is made of highly light-transmitting polydimethylsiloxane and has a thickness of 10-100 µm to ensure optical performance and reduce optical loss.

17. The method according to claim 10, wherein the adjustable sun-visor is made of a heat-insulating material of any one selected from the group consisting of a polystyrene foam, a polyurethane foam and a glass fiber.

18. The method according to claim 10, wherein the first preset part is 0-50% an area of the cation selective nanofilm, and the second preset part is 0-50% an area of the anion selective nanofilm.

* * * * *